Oct. 12, 1965   J. M. TIFFANY   3,212,090
RADAR TARGET ECHO INDICATING SYSTEMS
Filed May 8, 1961   2 Sheets-Sheet 1

*INVENTOR.*
*J. M. TIFFANY*
BY
*R. P. Miller*
ATTORNEY

Oct. 12, 1965  J. M. TIFFANY  3,212,090
RADAR TARGET ECHO INDICATING SYSTEMS
Filed May 8, 1961  2 Sheets-Sheet 2

INVENTOR.
J. M. TIFFANY
BY R. P. Miller
ATTORNEY

United States Patent Office 3,212,090
Patented Oct. 12, 1965

3,212,090
RADAR TARGET ECHO INDICATING SYSTEMS
John M. Tiffany, Winston-Salem, N.C., assignor to Western Electric Company, Incorporated, a corporation of New York
Filed May 8, 1961, Ser. No. 108,483
10 Claims. (Cl. 343—17.1)

This invention relates to radar target echo indicating systems, and more particularly to a system for overcoming the effect of interference which accompanies high frequency signals and noise which is developed in the radar system.

A limitation of long range radar equipment is that difficulty arises in distinguishing the weak echo pulses reflected from a target from the accompanying noise or interference impulses and systems noise in the radar set. It is typical of a video signal, containing both echo pulses and noise impulses, that successive weak echo pulses are not of the same amplitude. Also, noise impulses usually occur in a random time relationship with respect to the echo pulses and are of widely varying amplitudes. Since these characteristics of a video signal and noise impulses are normally present, it is probable that there are times, over a period of several hundred successive echo pulses, when the echo pulse amplitude is greater than the noise impulse amplitude. These brief periods when noise is not interfering with the echo pulse are the periods when the most useful echo signal occurs. However, these favorable conditions or periods occur so seldom that it is difficult or impossible for the eye to discriminate between the echo signal and the noise signal on an indicator screen.

It is an object of the present invention to provide a new and improved radar target echo indicating system.

It is a further object of this invention to provide a system for overcoming the effect of interference which accompanies a high frequency signal and to overcome noise which is developed in an electronic system.

Another object of this invention is to provide a circuit for obviating the effect of noise impulses which occur between pulses of an echo signal.

A still further object of this invention is to provide a radar system for transmitting and receiving coded pulses.

Still another object of this invention is to provide a circuit for producing coded signals and for receiving the coded echo pulses thereof during time periods when no interference impulses are distorting the coded echo pulse.

Another object of this invention is to provide a gate circuit for passing coded pulses which are not distorted by noise or interference impulses and for blocking the coded pulse at times when noise impulses are distorting the coded pulses.

With these and other objects in mind, the present invention contemplates a radar transmitting and receiving system having a gating circuit designed to block continuously generated gate or indicating pulses when a coded echo signal is received during periods when interference impulses are distorting the coded echo signal. A synchronizer generates a series of pulses in a predetermined timed relationship as coded pulses for transmission by the transmitter. A receiver is used to receive the coded echo signal which results when the transmitted coded signal strikes and is reflected from a target. The received coded echo signal, together with accompanying noise, is fed into a gating network which is designed to pass one or a part of one of the pulses of the continuous series of gate or indicating pulses only when a coded echo signal identical to the transmitted coded signal occurs at the input to the gate network. When the precise coded echo signal appears at the gate, the gate opens and permits one or a part of one of the continuous series of gate or indicating pulses to appear at a cathode-ray tube indicator. The gate network consequently eliminates the noise interference which results from interference outside the radar set as well as from noise generated in the set.

Other objects and advantages of the invention will become apparent by reference to the following detailed description and the accompanying drawings illustrating a preferred embodiment thereof, in which.

Figure 1:
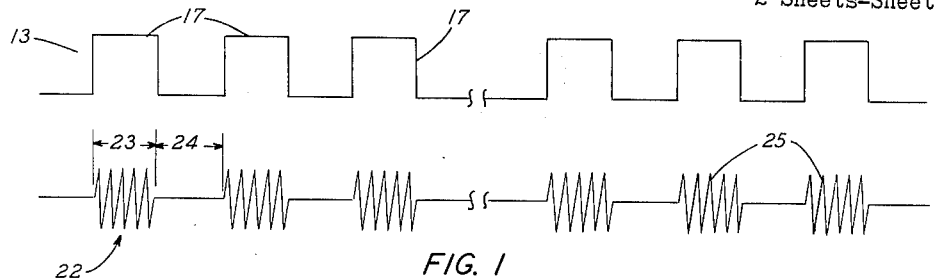
FIG. 1 illustrates several coded wave forms generated and utilized by a radar system shown in FIG. 2.
Figure 2:
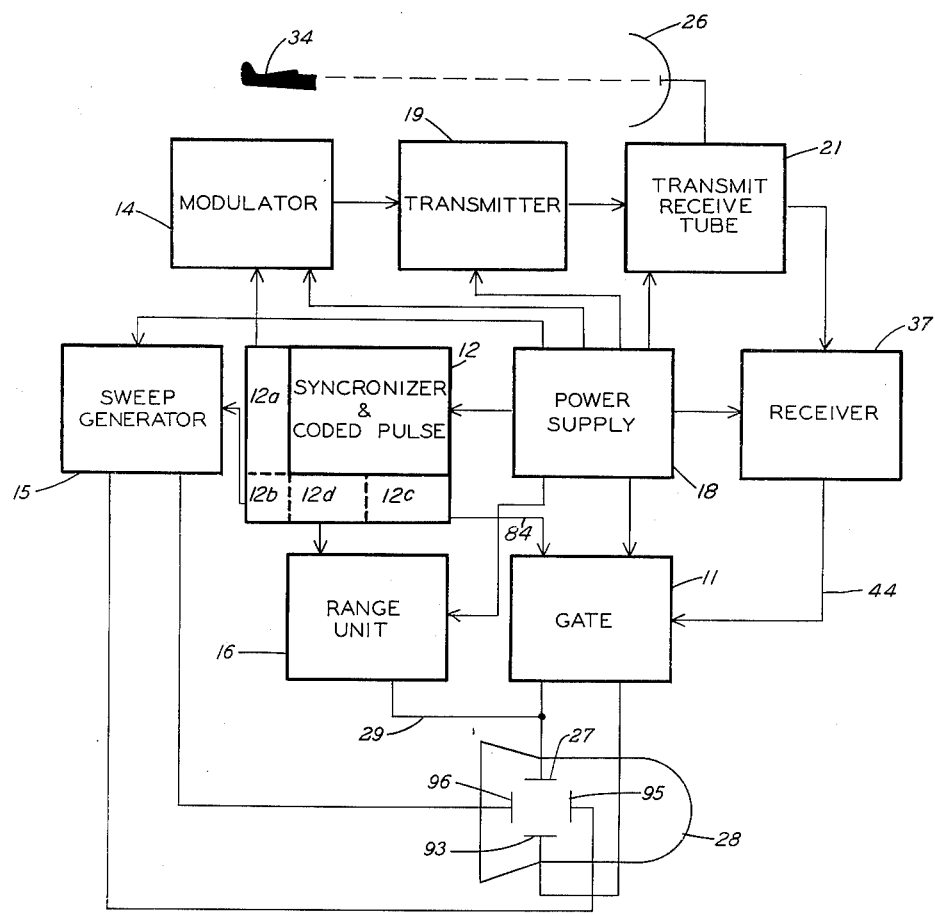
FIG. 2 is a schematic block diagram of a radar system showing a gate network interconnected with the major circuits of a radar set.

Referring now to the drawings, and in particular to FIG. 2, there is shown a gating network generally designated by numeral 11 connected in a radar system. A primary power supply 18 furnishes D.C. and A.C. power to operate or control all of the units of the radar system including the gate network 11. Action of the radar set is initiated by a synchronizer 12 having four sections 12a, 12b, 12c, and 12d. The synchronizer 12 provides coded pulses to a modulator 14 from the section 12a, sweep pulses to a sweep generator 15 from the section 12b, gate pulses continuously to the gate circuit 11 from section 12c, and range pulses to a range unit 16 from the section 12d. The coded pulses generated for the modulator 14 from the section 12a of the synchronizer 12 are in the form of D.C. pulses and are illustrated by wave form 13 of FIG. 1. The individual D.C. pulses 17 used to trigger the modulator 14 are generated in a predetermined timed relationship or code so that after a coded signal has been reflected from a target 34, the predetermined coded signal returning as an echo signal can be used to open the gate network 11. An example of a code which can be used by the radar system is a series of three equally timed and spaced D.C. pulses, see FIG. 1. Each pulse or mark digit may have a time duration of one microsecond and is followed by a space digit or period in which no voltage is generated for a period of one microsecond. The last pulse or mark digit in the code, is followed by an extended space period of zero voltage to separate the first coded series of three pulses from a subsequent identical series of three pulses. The section 12a of synchronizer 12 which generates the coded pulses may include a square wave generator for generating a pulse, a distributor for separating the square wave pulses, and a standard delay circuit for separating one series of such pulses from a second such series. It may also be similar to the signal generator described in Patent 2,865,997 issued to Joseph Gardberg with readily apparent circuit change necessary to adapt it to this application.

The individual D.C. pulses 17 trigger the modulator 14 to generate high energy D.C. pulses of the same shape and nature as the triggering pulses 17. Since the modulator 14 operates only in response to the trigger pulses 17, the high energy pulses will be generated in the same timed relationship or code as the triggering pulse thereby maintaining the identity of the code.

The high energy D.C. pulses from the modulator 14 trigger the transmitter 19. The transmitter 19 generates high power radio frequency pulses which pass through a transmit-receive tube 21. Transmitter 19 generates a wave form containing discrete pulses similar to wave form 22 of FIG. 1. The pulse mark duration 23 and pulse spacing 24 remain the same as the original pulse pattern or code from the synchronizer 12. The transmitter, however, generates radio frequency output during the pulse duration 23, so that the pulse generated by the synchronizer 12 can be transmitted.

Radio frequency pulses 25 of output wave 22 pass through transmit-receive tube 21 to antenna 26 for transmission. Transmit-receive tube 21 rapidly switches the antenna 26 from the transmitter section of the radar system to the receiver section of the radar system so that there is alternate use of antenna 26 for transmission and receiving purposes. Any conventional system for rapidly switching the system for transmit to receive will satisfy the requirements of this system to use antenna 26 first as a transmitting antenna and then as a receiving antenna. The transmit-receive tube is only shown for the purpose of illustrating the invention.

Figure 3:
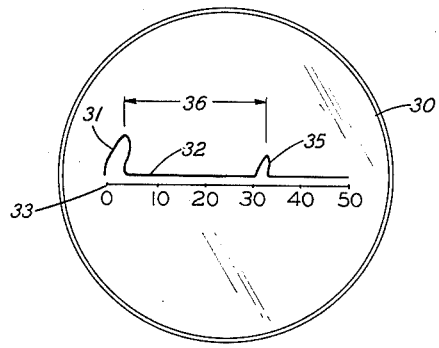
FIG. 3 shows the face of a cathode-ray tube indicator with a time scale and a tracer wave thereon.

Conveniently, when the transmit-receiver tube 21 passes a coded signal of radio frequency pulses from the transmitter 19 from section 12d to the antenna 26, synchronizer 12 passes a range pulse to range unit 16. The range pulse triggers the range unit 16 to generate a pulsating output signal which is fed to plate 27 of cathode-ray tube 28, over line 29. The output from range unit 16 produces a range marker 31 on cathode-ray tube trace 32, see FIG. 3. Range marker 31, which occurs at a time of zero on the time scale 33 of cathode-ray tube screen 30 occurs at the same time that a coded pulse signal is transmitted from antenna 26. Since transmitted radio frequency signals travel at a precisely known speed, the time necessary for the transmitted coded signal to travel to target 34 and back to antenna 26 is a measure of the distance of the target 34 from the antenna 26. A returning coded echo signal is used to produce target marker 35 so that the time period 36 on scale 33 represents the distance of the target 34 from antenna 26, see FIG. 3.

As noted, the coded signal composed of transmitted pulses is reflected from the target 34 and return to antenna 26 as a coded echo signal. The echo signal is picked up by antenna 26 and passed through transmit-receive tube 21 to receiver 37 where the receiver 37 converts the coded echo signal to a coded video signal, having the same code as the transmitted code. The received coded echo signal is exactly the same as the coded signal transmitted by the transmitter 19, except that the coded echo signal is of lower power due to the transmission loss and is accompanied by undesirable noise impulses picked up by the antenna 26 and by noise impulses generated by the receiving circuits. In prior standard radar systems the noise impulses are often of such magnitude and sufficient duration to preclude reception and observation of signals indicative of the distance of the target. However, there are enough relatively noise free echo pulses received over any given period of receiving time to produce a signal which is usable by the presently described system to identify the target 34. The coded video signal together with undesirable noise impulses is fed on line 44 to the gate network 11 where the coded video signal which is accompanied by disruptive noise does not open the gate 11 but where coded video signals relatively free of noise enable gate network 11 to pass gate pulses, alternatively called indicating pulses, from the section 12c of the synchronizer 12 to cathode-ray tube 28 where the passed gate pulse or a part thereof produces a target marker 35 on the trace 32 of cathode ray tube screen 30. Conveniently, the continuous generation of gate or indicating pulses from the section 12c of the synchronizer 12 may be initiated simultaneously with the initiation of the sweep pulses and the range pulses from the sections 12b and 12d, respectively, of the synchronizer 12. However, the only requirement as to the time of initiation of the gate or indicating pulses is that the section 12c begin generation of these pulses before the gate 11 receives a properly coded video signal on line 44 from the receiver 37. The repetition rate of the gate or indicating pulses may or may not be synchronized with the signal generated by the section 12a of the synchronizer. The only requirement for the repetition rate of the gate or indicating pulses is that one pulse, or a part of one pulse, is present on the line 84 for passage through the gate 11 to the cathode ray tube 28 when the gate 11 is opened by the receipt of a properly coded echo signal on the line 44. If the repetition rate of the gate or indicating pulses is too great, there is a possibility that more than one of these pulses will be present on the screen 30 of the cathode ray tube 28. On the other hand, if the repetition rate of the gate pulses is too small, there is a possibility that no gate pulse will be present on the line 84 for display on the screen 30 of the cathode ray tube 28. Therefore, the repetition rate of the gate pulses is initially adjusted to be compatible with the repetition rate of the coded signals.

Figure 4:
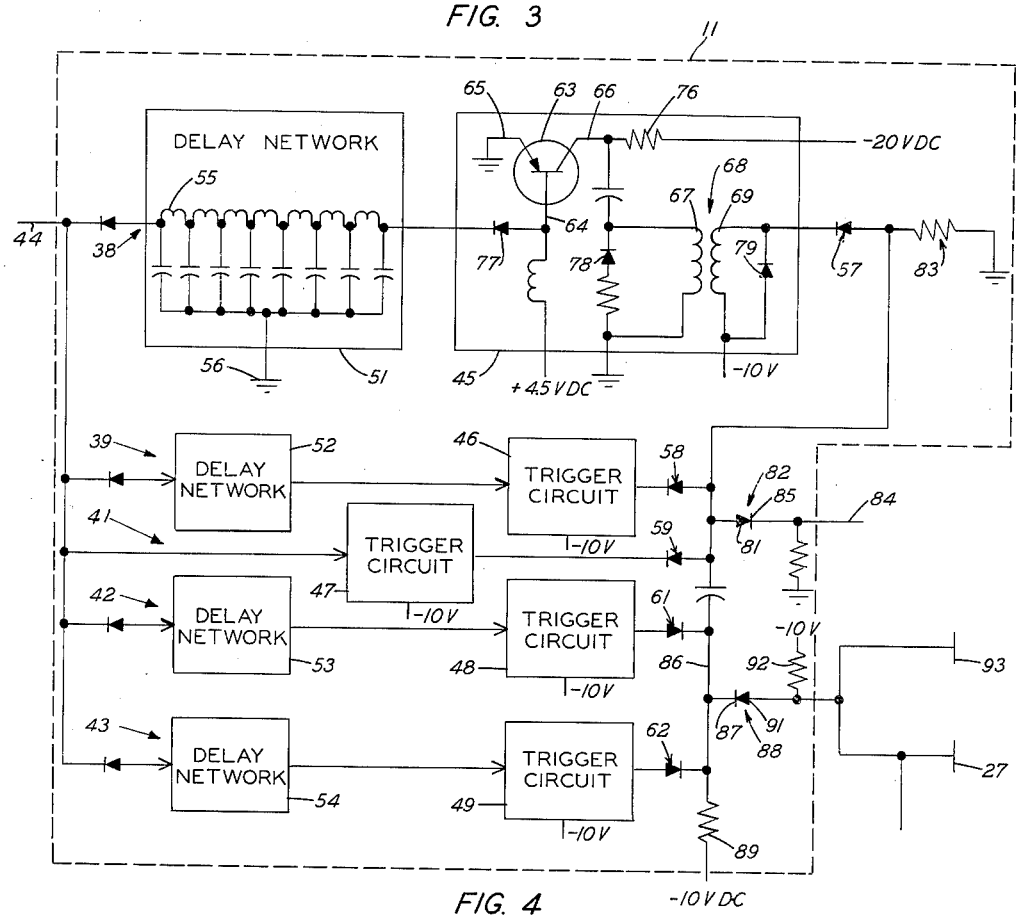
FIG. 4 is a detailed disclosure of a preferred embodiment of a gate network illustrated in block form in FIG. 2.

The operation of gate network 11 is best illustrated by reference to FIG. 4. A typical pulse code may consist of three pulses or mark digits, each one microsecond in duration with spacer periods or space digits 24 of one microsecond duration between the first and second mark digits and with the same spaced duration between the second and third mark digits. The entire code is of five microseconds duration. The gate network 11 has five channels 38, 39, 41, 42, and 43, see FIG. 4. Channels 38, 39, and 41 are designed to be operated to allow the passage of a gate pulse to the cathode ray tube 28 by the presence of properly timed echo mark pulses similar to pulses 17. Channels 42 and 43 are designed to be operated to allow the passage of a gate pulse to the cathode ray tube 28 by the absence of an echo mark pulse or an echo space digit which occurs at the proper time with respect to the mark pulses. In the case of the previously described three mark pulse code, gate network 11 will be opened to pass a gate pulse or a part of a gate pulse generated by section 12c of the synchronizer 12 on line 84, if a mark digit appears on channel 38 during the first one microsecond time period; a space digit appears on channel 42 during the second one microsecond time period; a mark digit appears on channel 39 during the third one microsecond time period, a space digit appears at channel 43 during the fourth one microsecond time period; and a mark digit appears at channel 41 during the fifth one microsecond time period.

In order to open gate network 11, to pass one gate pulse or a part of a pulse from section 12c of synchronizer 12, each echo code mark and space must simultaneously appear at trigger circuits 45, 46, 47, 48, and 49, respectively. Since the coded pulses of each echo signal arrive serially, but are presented to gate network 11 from receiver 37 over input 44 on five parallel channels, the first mark digit must be delayed four microseconds so that it will appear at trigger circuit 45 at the same time that the third mark digit appears at trigger circuit 47. The first mark digit must be delayed four microseconds; the second digit, a space, must be delayed three microseconds; the third digit, a mark digit, must be delayed two microseconds; and the fourth digit, a space digit, must be delayed one microsecond so that digits one, two, three, and four will appear at trigger circuits 45, 46, 48, and 49, respectively, at the same time that digit five, a mark digit, appears at trigger circuit 47 on channel 41. In order to accomplish the proper delay, delay networks 51, 52, 53, and 54 are provided. Each delay network consists of a tapped inductance coil 55 with a capacitor connected from each tap to a common ground 56. The delay of a pulse, measured in seconds, provided by each section of inductors and capacitors can be precisely calculated from the known values of inductance and capacitance. The proper time delay for the individual delay networks is obtained by cascading the sections of inductors and capacitors as shown in delay network 51. It should be noted that channel 41, which accommodates the fifth coded digit, the third mark digit, does not have a time delay network and does not need one since when the third mark digit appears on channel 41 during the fifth one microsecond time period, the trigger circuits 45, 46, 47, 48, and 49 are conidtioned for immediate simultaneous operations.

In addition to the delay circuits, the channels 38, 39, 41, 42, and 43 each have a monostable trigger circuit 45, 46, 47, 48, and 49, respectively. The output voltage condition of a trigger circuit is a known quantity. The "ON" condition, operating condition, is of about one microsecond duration and the "OFF" condition is the nonoperative condition of trigger circuits 45, 46, 47, 48 and 49. Since these output "ON" and "OFF" conditions are of known magnitude and duration, it is possible to determine the gate bias voltages required to block or open bias diodes 57, 58, 59, 61 and 62.

Assume a favorable condition when the received coded echo pulses are not accompanied by noise impulses. The first and second mark digits are delayed on channels 38 and 39 by delay networks 51 and 52, respectively, but the third mark digit is not delayed in channel 41. Inputs to trigger circuits 48 and 49 are also properly delayed to arrive at trigger circuits 48 and 49 simultaneously with the third mark digit, but since in the ideal situation, no digit appears at trigger circuits 48 and 49, circuits 48 and 49 are not triggered "ON."

Each of the trigger circuits 45, 46, 47, 48 and 49 are identical and a detailed explanation of circuit 45 applies equally to circuits 46, 47, 48 and 49. Trigger circuit 45 provides a positive pulse output when triggered by a negative mark pulse at the base of 64 of transistor 63. The coded pulses which come from the receiver 37 are negative pulses; it is to be understood that positive pulses as shown in FIG. 1 can be utilized with only minor changes in circuitry.

Transistor 63 is held nonconductive by a positive voltage source, such as 4.5 volts, provided by power source 18 which maintains base 64 positive with respect to grounded emitter 65. Power source 18 also provides a negative bias voltage such as 20 volts, for collector 66 to maintain collector 66 sufficiently negative with respect to emitter 65 and base 64 so that conduction will occur when base 64 is driven negative with respect to emitter 65. Assuming that the mark pulse or digit from receiver 37 is a negative value, such as 10 volts, the negative mark pulse applied to base 64 from receiver 37 will make base 64 negative with respect to emitter 65 and the transistor 63 will begin to conduct to produce an output from collector 66. The transistor output is connected through primary winding 67 of transformer 68 to ground. Transformer 68 is polarized so that a positive voltage is induced in secondary winding 69 which is connected to a negative voltage source, such as 10 volts from power source 18. The induced positive voltage opposes the negative bias voltage from power source 18 to make the cathode of diode 57 positive and render diode 57 inoperative to block passage of positive pulses from transformer 68. When diode 57 is held inoperative, the anode 81 of diode 82 is at ground potential.

Resistor 76 is a collector load resistor for the transistor 63. Diode 77 is used to electrically isolate transistor 63 from delay network 51 and diodes 78 and 79 are clamping diodes for grounding the reactively induced currents from the transformer windings 67 and 69, respectively, when the magnetic field about the windings collapses.

In the ideal situation when properly coded negative mark pulses appear at trigger circuits 45, 46 and 47 and properly coded space digits appear at circuits 48 and 49, the gate diodes 57, 58, 59, 61 and 62 are biased to block passage of output pulses from trigger circuits 45, 46, 47, 48 and 49, respectively. The cathodes of gate diodes 57, 58 and 59 are positively biased by the conducting transistors in circuits 45, 46 and 47 so that the anode 81 of diode 82 is at ground potential through resistor 83. A negative 10 volt gate pulse appearing at input 84 the section 12c of synchronizer 12 makes cathode 85 of gate diode 82 negative so that gate diode 82 is rendered open to pass the negative gate pulse to line 86. Since space digits properly appeared at the inputs of gates 48 and 49, the transistors of those gates remain nonconductive. The negative 10 volt bias, applied through secondaries of transformers which are similar to the secondary 69 of the transformer 68, from power supply 18 maintains the anodes of diodes 61 and 62 negative, thus, rendering diodes 61 and 62 closed to passage of a gate pulse to line 86. A negative 10 volt bias is applied to cathode 87 of diode 88 through resistor 89, and a negative 10 volt bias is applied to anode 91 through resistor 92, thus producing a zero voltage across gate diode 88. When a negative gate pulse from the section 12c of the synchronizer 12 (FIG. 2) passes through diode 82 to line 86 and appears at cathode 87 of gate diode 88, diode 88 is opened and the negative pulse passes through diode 88 to appear on plates 27 and 93 of cathode-ray tube 28 to produce a target marker 35 on trace 32.

Next assume a condition when the first echo mark digit does not appear on line 44, and noise, representing a mark digit, appears for the second digit or first space digit. This is not the correct code. The result is that no negative pulse will trigger transistor 63 and consequently a negative 10 volt bias from trigger circuit 45 through transformer winding 69 and diode 57 appears on the anode 81 of diode 82 to render diode 82 a block to passage of all the negative gate pulses continuously generated by the section 12c of the synchronizer 12 at input 84. Additionally, at the same time that circuit 45 is rendering diode 82 nonconductive, a positive output appears at the anode of diode 61 from circuit 48 which is triggered to conduction by a spurious negative noise pulse on channel 42. The positive pulse from circuit 48 passes through opened diode 61 and renders cathode 87 of diode 88 positive to disable gate diode 88. Consequently, a negative gate pulse from the section 12c of the synchronizer 12 will not only be blocked by disabled diode 82 but if it should pass diode 82, it is also blocked by disabled diode 88 so that its passage to plates 27 and 93 is effectively impeded. Only the combination of biases, mark-space-mark-space-mark, represent the proper arrangement of coded digits to pass a gate pulse from synchronizer 12 through gate 11 to cathode-ray tube 28. Any other combination of biases appearing simultaneously at triggered circuits 45, 46, 47, 48 and 49 will impede the passage of a gate pulse to the cathode ray tube. Sweep generator 15 is a conventional sweep generator and is triggered by sweep pulses from the section 12b of the synchronizer 12 so that a sweep voltage is applied to plates 95 and 96 to sweep the electron beam of the cathode ray tube 28 from left to right across the face of the cathode ray indicator tube to produce a trace 32. Conveniently, operation of the sweep generator 15 may be initiated by passing a signal from the section 12b of the synchronizer 12 when a coded signal is passed to the antenna 26 from the section 12a of the synchronizer 12.

It is to be understood that the above-described apparatus is merely illustrative of the application of the principles of the invention and many other modifications may be made without departing from the scope and spirit thereof.

What is claimed is:

1. In a system for receiving signals, each signal consisting of a series of spaced pulses, means for generating a train of indicating pulses, means for displaying each indicating pulse, a gating circuit interposed between said generating means and displaying means, means for biasing said gating circuit to block each indicating pulse, and means responsive to the series of spaced pulses for overcoming said biasing means to open said gating circuit to pass an indicating pulse to said displaying means.

2. In a radar system, means for generating a series of signals, each signal including a series of coded space and mark pulses, means for transmitting said coded pulses to a target, means for receiving echo coded pulses from said target, a circuit operated at each generation of a signal for generating an indicating signal, means responsive to said indicating signal for presenting a visual display, a series of gating networks interposed between said indicating signal generating means and said visual display means for blocking said indicating signal, means responsive to said echo mark pulses for rendering ineffective a group of said gating networks, and means responsive to said echo space pulses for rendering ineffective the remainder of said gating networks.

3. In a radar system, means for generating a series of signals, each signal including a series of coded space and mark pulses, means for transmitting said coded pulses to a target, means for receiving echo coded pulses from said target, a range unit for generating a time reference pulse, a circuit operated at each generation of a signal for generating an indicating signal, means responsive to said time reference pulse and said indicating signal for presenting a visual display, a series of gating networks interposed between said indicating signal generating means and said visual display means for blocking said indicating signal, means responsive to said echo mark pulses for rendering ineffective a group of said gating networks, and means responsive to said echo space pulses for rendering ineffective the remainder of said gating networks.

4. A system for receiving a succession of coded pulses which comprises means for receiving said successive coded pulses, means for generating gate pulses, a series of gate elements, means connected to said receiving means for selectively delaying all but the last of said coded pulses, means for applying biasing potential through said gate elements to impede transmission of said gate pulses, means responsive to said delayed and undelayed coded pulses for overcoming said biasing potential, and means connected to said gate elements for indicating the receipt of said gate pulses.

5. A system for receiving a succession of coded pulses which comprises means for receiving said successive coded pulses, means for generating gate pulses, a delay network connected to said receiving means for selectively delaying certain of said coded pulses, a plurality of diodes connected to said generating means, means for applying a biasing potential to said diodes to impede transmission of said gate pulses, a plurality of trigger circuits responsive to said delayed and undelayed coded pulses for overcoming the bias potential on said diodes to pass said gate pulses, and means connected to said diodes for indicating the receipt of said gate pulses.

6. A radar system for receiving a succession of coded pulses which comprises means for receiving said coded pulses, means for generating gate pulses, a plurality of delay networks connected to said receiving means for selectively delaying certain of said coded pulses, diodes for passing said gate pulses from said generating means, means for applying a bias potential to said diodes to impede passage of said gate pulses, a plurality of triggered circuits simultaneously responsive to said delayed and undelayed coded pulses for overcoming said bias potential and means connected to said diodes for indicating the receipt of said gate pulses.

7. A radar system for receiving a signal composed of a succession of coded pulses which comprises means for receiving said coded signal, means for generating gate pulses, means for selectively delaying pulses of said coded signal, a first gate network connected to said generating means for passing said gate pulses, means for applying a blocking potential to said first gate network to impede passage of said gate pulses, means responsive to a first group of said delayed coded pulses for overcoming said blocking potential, a second gate network connected to said first gate network for passing said gate pulses, means for applying a bias potential to said second gate to effectuate passage of said gate pulses, means responsive to a second group of said delayed coded pulses for rendering said applying means effective to apply said bias potential to said second gate, and means connected to said second gate for indicating receipt of said gate pulses.

8. A radar system for receiving a succession of coded signals having mark and space pulses which comprises means for receiving said coded signals, means for generating gate pulses, a plurality of delay networks connected to said receiver for selectively delaying certain pulses of said coded signal, a first diode connected to said generating means for passing said gate pulses, a second diode connected to said first diode for passing said gate pulse, a first means for applying a bias potential to said first diode to impede transmission of said gate pulses, a first group of trigger circuits connected to said delaying means and responsive to the mark pulse of said delayed coded signal for overcoming the bias potential on said first diode, a second means for impeding application of a blocking bias potential to said second diode, a second group of trigger circuits connected to said delaying means and responsive to the space pulse of said delayed coded signal for maintaining said second diodes effective to impede application of said blocking bias to said second diode, and means connected to said second diode for indicating the receipt of said gate pulses.

9. A radar system which comprises means for generating coded pulses and gate pulses, means triggered by said coded pulses for generating high energy pulses, means connected to said generating means for converting said high energy pulses to coded radio frequency pulses and for transmitting said coded radio frequency pulses, means for receiving coded radio frequency echo pulses, means connected to said receiving means for selectively delaying certain of said coded echo pulses, means connected to said generating means for passing said gate pulses, means for applying a bias potential to said passing means to block passage of said gate pulses through said passing means, means responsive to said delayed and undelayed coded echo pulses for overcoming said bias potential and means connected to said passing means for indicating passage of said gate pulses.

10. A radar system which comprises first means for generating coded pulses and gate pulses, second means triggered by said first generating means for generating high energy pulses, means connected to said second generating means for converting said high energy pulses to coded radio frequency pulses and for transmitting said coded radio frequency pulses, a receiver for receiving coded radio frequency echo pulses, a plurality of delay networks connected to said receiver for selectively delaying certain of said coded echo pulses, gate diodes connected to said first generating means for passing said gate pulses, biased diode means for applying a bias potential to said gate diodes to impede passage of gate pulses through said gate diodes, a plurality of trigger circuits simultaneously responsive to said delayed and undelayed coded echo pulses for overcoming said bias potential, and means connected to said gate diodes for indicating passage of said gate pulses.

References Cited by the Examiner

UNITED STATES PATENTS

| | | | |
|---|---|---|---|
| 2,517,752 | 8/50 | Wolff | 343—6.5 |
| 2,579,497 | 12/51 | Isbister | 343—11 |
| 2,768,372 | 10/56 | Green | 343—12 |
| 2,950,463 | 8/60 | Brunn | 343—6.5 X |

CHESTER L. JUSTUS, *Primary Examiner.*